May 22, 1934.  R. WHITALL  1,959,993
REFRIGERATING SYSTEM
Filed Nov. 27, 1931
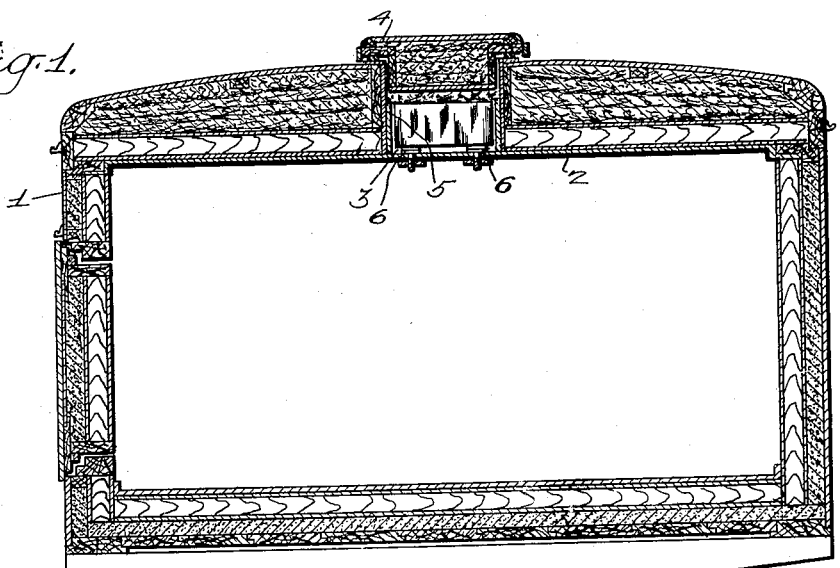
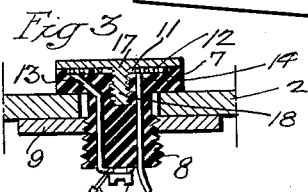
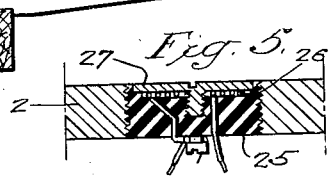
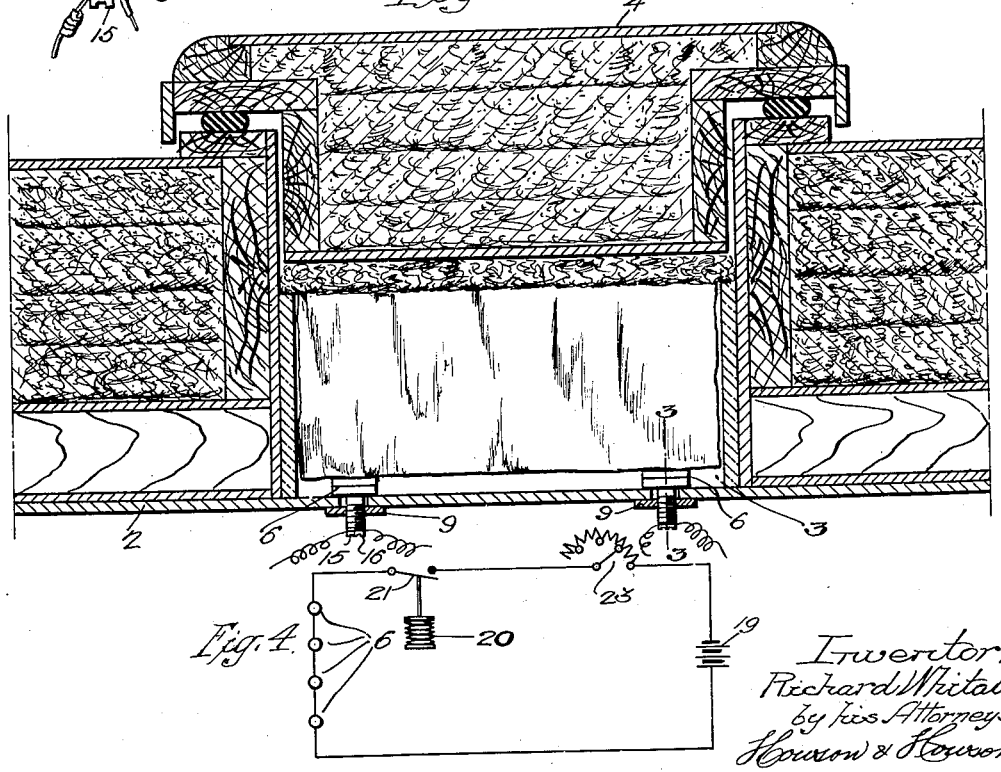
Inventor:
Richard Whitall
by his Attorneys
Howson & Howson Patented May 22, 1934

1,959,993

UNITED STATES PATENT OFFICE 1,959,993

REFRIGERATING SYSTEM

Richard Whitall, New York, N. Y.

Application November 27, 1931, Serial No. 577,608

11 Claims. (Cl. 62—91.5)

This invention relates to improvements in refrigerating systems, and more particularly to such systems employing solid $CO_2$ or the like as the refrigerating medium. The invention, however, is not limited to systems employing this particular medium, and may be used to advantage with any solid refrigerant which is capable of producing lower temperatures than those required in a given refrigerating process.

It has been discovered in the use of solid $CO_2$ as a refrigerating medium that a more efficient control of the refrigerating temperatures may be had by employing an efficient thermal conductor, of aluminum for example, or copper, interposed between the refrigerant and the space or material to be refrigerated, a system employing this principle being disclosed in the pending U. S. application of Edward Rice, Jr., Serial Number 467,999.

A principal object of the present invention is to provide novel and improved means for controlling the rate of sublimation of solid $CO_2$ in systems of this general character where the heat necessary for sublimation is conveyed to the solid $CO_2$ by means of a thermal conductor, such control of the rate of sublimation affording a corresponding efficient control of the temperature of the space or of the substance from which the heat is being withdrawn.

In the attached drawing:

Figure 1 is a sectional view through a refrigerated truck body and illustrates an embodiment of my invention;

Fig. 2 is an enlarged fragmentary sectional view illustrating details of the construction;

Fig. 3 is an enlarged sectional view on the line 3—3, Fig. 2;

Fig. 4 is a diagrammatic view illustrating an electrical circuit constituting an element of the device, and Fig. 5 is a sectional view similar to that of Fig. 3, illustrating a modification.

Referring to the drawing, 1 is the insulated body of a motor truck, the inner ceiling of which is formed in the present instance by a plate 2 of a metal having high thermal conductivity. The plate 2 constitutes the bottom wall of a chamber 3 which holds the refrigerating medium such, for example, as solid $CO_2$. Access to the chamber 3 is afforded by a removable trap or cover 4 in the top of the truck body, and the inner surfaces of the side walls of the said recess are insulated as indicated at 5 so that the refrigerant is in heat transferring relation practically solely with that portion of the conductor plate 2 constituting the bottom of the chamber.

In the aforesaid pending application Serial Number 467,999, it has been proposed to control the temperatures in the interior of the truck body 1 by suitable conductor resistance, in the form of sheets of heat-insulating material, placed between the refrigerant and the bottom wall of the chamber 3. I have discovered that corresponding results and an entirely adequate control are obtainable by interposing between the conductor and the refrigerant in lieu of the solid sheet previously used, pieces of insulation or material of low heat conductivity relatively small in size compared with the surface of the refrigerant opposed to the conductor. With the refrigerant held from the metal conductor 2 by a suitable number of relatively small studs of poor heat conducting material, the rate of heat transfer from the conductor to the refrigerant is limited, as indicated by a relatively slow rate of sublimation in the solid $CO_2$.

I have discovered further that when the solid $CO_2$ is so supported from contact with a metallic conductor by means of a number of relatively small studs of low heat conductivity, sublimation of the refrigerant occurs no more rapidly at the points of contact of the refrigerant with said studs than in the surrounding surfaces so that normally there is no tendency for the refrigerant to move down by gravity into contact with the said conductor. By applying heat to the said studs, however, it is possible to effect a sublimation of those parts of the refrigerant in contact therewith at a more rapid rate than in the surrounding surfaces, and by this means the refrigerant may be caused to move downwardly into a position of closer proximity to the metallic conductor or into actual contact therewith, thereby effecting a more rapid sublimation of the refrigerant and a consequently greater withdrawal of heat from the refrigerated space or substance with which the conductor may be associated.

In utilizing these principles in the efficient control of refrigerating temperatures, I may provide in connection with the metallic conductor 3 studs 6, as shown in Figs. 2 and 3, the body portions of these studs being formed of a material, such as vulcanized fibre, bakelite or hard rubber, of relatively low heat conductivity. The said body portions consist in the present instance of a cylindrical head portion 7 and a depending threaded shank 8, the shank in assembly being passed through an aperture in the conductor plate 3 and the stud being secured in the plate by means of a nut 9 on the lower projecting end of the threaded shank, as shown in Fig. 3. The upper surface of the stud is provided with a shallow recess 11 in which is positioned a coil 12 of resistance wire, leads to the opposite ends of the coil passing downwardly through suitable passages, 13 and 14 respectively, extending from the said recess 11 to the lower end of the shank 8. Binding posts 15 and 16 for these leads may be provided on the bottom of the shank through which the coil may be connected in a suitable electric circuit. A metallic cover-plate 17 is provided at the top of the body portion, this plate having in the present instance a threaded stem 18 which enters a correspondingly threaded recess in the said body member 6, the plate 17 when assembled with the body lying contiguous to but not in electrical contact with the coil 12. By passing an electric current through the said coil, the latter is caused to heat up, and in turn to heat the plate 17, upon which as previously described and as shown in Fig. 2 the refrigerant rests. The arrangement is such that the body portion of the stud, which as previously set forth is of low heat conductivity, is interposed between the refrigerant and the conductor element 2. A typical circuit including the coils of four of the studs described above is illustrated in Fig. 4, this circuit in addition to the source of current 19 being provided with a switch 21 and preferably also with a rheostat 23.

In practice, a suitable substantially constant temperature may be maintained in the interior of the body 1 with the solid $CO_2$ supported as illustrated upon the studs, but if by reason of opening the doors of the body to withdraw some of the contents the temperature rises to an undesirable degree, closing of the switch 21 will cause a heating of the stud coils and a consequent relatively rapid sublimation of the refrigerant in contact with the studs. This rapid sublimation causes the refrigerant to move downwardly by gravity around the studs and into contact with the conductor 3 whereby through the conductor it is in direct conductive association with the interior of the truck body. The rate of sublimation of the refrigerant is thus materially increased with a consequent relatively rapid withdrawal of heat from the refrigerated space. When the temperature has been reduced to the desired point, the switch 21 is opened. Sublimation of the refrigerant now occurs more rapidly on those surfaces in contact with the conductor 3 than in the relatively small surfaces in contact with the studs 6, and the consequent sublimation at the first-named surfaces results in a separation of the refrigerant from the conductor 3 and an interruption of the direct conductive path between the refrigerated space and the solid $CO_2$. So long as this condition prevails and no abnormal leakage occurs, the temperature in the interior of the truck body remains substantially constant. It will be apparent, therefore, that my device affords a simple and highly effective means for controlling the temperatures in the refrigerated space by simple manipulation of the electric circuit.

My invention further contemplates an automatic control of temperatures by employing a thermostatic actuator 20 for the switch 21 located within the refrigerated space. Elevation of the temperatures within the space above a predetermined point will thus automatically close the switch 21, and when the temperature falls to the desired point, the switch will automatically open, thereby maintaining substantially constant desirably low temperatures. By regulating the rheostat 23, the rapidity of sublimation of the refrigerant in contact with the studs may be regulated as found desirable.

It will be apparent that my invention is capable of many embodiments other than that herein disclosed, and I do not wish to limit myself to the details of construction as shown and described for the purpose of illustrating the invention. I have found, for example, that instead of the elevated studs shown in Fig. 3, I may employ a stud construction such as illustrated in Fig. 5 wherein the insulated body 25 is set into the conductor plate 2 so as to lie flush with the upper surface of the plate. In this instance, the body 25 is recessed not only for reception of the heating coil 26, but also for the cover-plate 27, so that the upper surface of this plate also lies substantially flush with the upper surface of the plate 2, but being insulated from the latter by the surrounding portion of the body 25. In other respects, this construction corresponds to that previously described and shown in Fig. 3, and the operation is substantially the same as that described. In this instance, the tendency of those portions of the refrigerant body adjacent the surfaces of the plate 2 to sublimate more rapidly than those in contact with the stud causes an arching effect which separates the refrigerant from direct contact with the plate. When the system is used in conjunction with vehicles or other moving refrigerators, the stud construction illustrated in Fig. 3 is desirable by reason of the tendency of the studs to maintain the refrigerant fixed within the chamber.

The device is not limited in utility to maintaining constant refrigerating temperatures, but may be employed to effect regulated temperature changes, either up or down, or cycles of change. The efficiency of the refrigerator casing is a considerable factor and in some instances and under some conditions it may be necessary or desirable, in order to effect a given refrigerating condition, to maintain a continuous limited heating of the studs or their equivalent.

There may be still other modifications without departure from the invention.

I claim:

1. In a refrigerating system employing a solid refrigerant, the combination with a thermal conductor in conductive association with the space or substance to be refrigerated, of means having relatively low heat conductivity as compared with said conductor for normally supporting the refrigerant from direct contact with said conductor, and means for heating said supporting means to permit movement of said refrigerant into closer heat-transferring relation with said conductor.

2. In a refrigerating system of the stated character employing a solid refrigerant, the combination with a thermal conductor, of a plurality of studs of relatively small area as compared with the opposed areas of the refrigerant and said conductor and of relatively low heat conductivity interposed between the refrigerant and the conductor and normally supporting the refrigerant from contact with the conductor, and means for heating said studs to permit movement of the refrigerant toward the conductor.

3. In a refrigerating system employing a solid refrigerant, the combination with a thermal conductor constituting a heat-transferring medium between the refrigerant and the space or substance to be refrigerated, of means normally preventing movement of the refrigerant toward the conductor, said means being rendered ineffective by heating, and means for heating said preventing means.

4. In a refrigerating system of the stated character, the combination with an element constituting a conductor for heat between the space or body to be refrigerated and the refrigerant and having a plurality of restricted areas of relatively low heat conductivity opposed to the surface of said refrigerant, of means for heating said areas.

5. In a refrigerating system of the stated character, the combination with an element adapted for contact over an area thereof with the refrigerant, said element having in said area, a plurality of minor areas of relatively low heat-conducting capacity, said minor areas being so arranged as to constitute an effective support for the refrigerant body, and means for heating said minor areas to provide for contact of the surrounding portions of the conductor with the refrigerant.

6. In a refrigerating system of the stated character, the combination with a member adapted for contact with the refrigerant over an area thereof and constituting a heat-conductive path between the space or body to be refrigerated and the refrigerant, of a plurality of elements of relatively low heat-conductive capacity so constructed and arranged within said area as to constitute a stable support for the refrigerant, and means for applying heat to said elements to regulate the heat-transfer relation between the member and the refrigerant.

7. In a refrigerating system of the stated character, the combination with a member constituting a conductor for transfer of heat between the refrigerated space or body and the refrigerant, of an insulated support for the refrigerant of lesser area than the area of the refrigerant opposed to said conductor, and means for applying heat to said support to permit movement of the refrigerant toward the conductor and to thereby regulate the heat-transfer relation between the conductor and the refrigerant.

8. In a refrigerating system, the combination with a thermal conductor in conductive association with the space or substance to be refrigerated, of a plurality of elements of relatively low heat-conductive capacity normally supporting the refrigerant in spaced relation with said conductor, heating coils in said elements opposed to the surface of the refrigerant, and means for energizing said coils to permit movements of the refrigerant into closer proximity to the conductor.

9. In a refrigerating system employing solid refrigerants, the combination with a solid thermal conductor constituting a heat-transferring medium between the refrigerant and the space or substance to be refrigerated, of means for supporting the refrigerant in spaced relation to said conductor, and means for elevating the temperature of said supporting means to effect a destruction of those portions of the refrigerant in contact therewith and a resultant approach movement of the refrigerant with respect to the conductor.

10. In a refrigerating system employing solid refrigerants, the combination with a solid thermal conductor constituting a heat-transferring medium between the refrigerant and the space or substance to be refrigerated, of means for supporting the refrigerant in spaced relation to said conductor, said supporting means being of relatively small effective area as compared with the contacted surface of the refrigerant, and means for effecting changes in the temperature of said supporting means to thereby regulate the heat-transfer relation of said refrigerant with respect to the conductor.

11. In a refrigerating system employing solid refrigerants, the combination with a solid thermal conductor constituting a heat-transferring medium between the refrigerant and the space or substance to be refrigerated and having a surface area exposed to said refrigerated space or substance in excess of the surface area thereof exposed to the refrigerant, of means for supporting the refrigerant in spaced relation to said conductor, and means for regulating the temperature of said support to thereby control the heat-transfer relation between the refrigerant and the conductor.

RICHARD WHITALL.